(12) United States Patent
Tsuboi

(10) Patent No.: US 11,294,994 B2
(45) Date of Patent: Apr. 5, 2022

(54) IC CARD AND METHOD FOR CONTROLLING IC CARD

(71) Applicants: Kabushiki Kaisha Toshiba, Minato-ku (JP); Toshiba Infrastructure Systems & Solutions Corporation, Kawasaki (JP)

(72) Inventor: Tomomi Tsuboi, Kawasaki (JP)

(73) Assignees: Kabushiki Kaisha Toshiba, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 189 days.

(21) Appl. No.: 15/904,622

(22) Filed: Feb. 26, 2018

(65) Prior Publication Data

US 2018/0276357 A1  Sep. 27, 2018

(30) Foreign Application Priority Data

Mar. 21, 2017  (JP) .............................. JP2017-054474

(51) Int. Cl.
*G06F 21/00* (2013.01)
*G06F 21/32* (2013.01)
(Continued)

(52) U.S. Cl.
CPC ............ *G06F 21/32* (2013.01); *G06F 3/0604* (2013.01); *G06K 9/00013* (2013.01); *G06K 19/07* (2013.01); *G07C 9/26* (2020.01)

(58) Field of Classification Search
CPC ... G06F 21/32; G06F 3/0604; G06K 9/00013; G06K 19/07; G07C 9/26
See application file for complete search history.

(56) References Cited

U.S. PATENT DOCUMENTS

2003/0217270 A1   11/2003  Nakayama
2004/0086157 A1   5/2004   Sukegawa
(Continued)

FOREIGN PATENT DOCUMENTS

CN   106503777 A   3/2017
EP   1 074 949 A1  2/2001
(Continued)

OTHER PUBLICATIONS

Kokilavani, S. et al. Enhanced biometric smart key scheme for smart card authentication. 2014 International Conference on Communication and Signal Processing. https://ieeexplore.ieee.org/stamp/stamp.jsp?tp=&arnumber=6950116 (Year: 2014).*

(Continued)

*Primary Examiner* — Jeremiah L Avery
(74) *Attorney, Agent, or Firm* — Oblon, McClelland, Maier & Neustadt, L.L.P.

(57) ABSTRACT

An integrated circuit (IC) card of an embodiment includes a communicator, a storage storing biometric authentication information, an acquirer, and a processor. The communicator communicates with a terminal device. The acquirer acquires biometric information of a user. The processor collates the biometric information of the user acquired by the acquirer with the biometric authentication information stored in the storage and stores a collation result into the storage at an activation time.

7 Claims, 4 Drawing Sheets

(51) Int. Cl.
*G06K 9/00* (2022.01)
*G06K 19/07* (2006.01)
*G06F 3/06* (2006.01)
*G07C 9/26* (2020.01)

(56) References Cited

U.S. PATENT DOCUMENTS

| | | | |
|---|---|---|---|
| 2004/0129787 A1 | 7/2004 | Saito et al. | |
| 2005/0144354 A1* | 6/2005 | Murashita | G06F 21/34 711/100 |
| 2006/0080548 A1 | 4/2006 | Okamura | |
| 2006/0089809 A1 | 4/2006 | Satou et al. | |
| 2006/0224645 A1* | 10/2006 | Kadi | G06F 3/0488 708/200 |
| 2007/0220273 A1 | 9/2007 | Campisi | |
| 2008/0122577 A1 | 5/2008 | Gutta et al. | |
| 2008/0223925 A1* | 9/2008 | Saito | G06Q 20/341 235/380 |
| 2008/0252412 A1 | 10/2008 | Larsson | |
| 2008/0289032 A1* | 11/2008 | Aoki | G06F 21/33 726/19 |
| 2009/0084858 A1 | 4/2009 | Borracci | |
| 2009/0201128 A1 | 8/2009 | Campisi | |
| 2013/0036463 A1 | 2/2013 | Shashidhar | |
| 2015/0286922 A1* | 10/2015 | Saito | G07C 9/28 340/5.82 |
| 2016/0171199 A1 | 6/2016 | Beatson et al. | |
| 2016/0241554 A1* | 8/2016 | Zizi | G06K 9/00885 |
| 2018/0025014 A1* | 1/2018 | Liu | G06F 16/164 707/748 |
| 2018/0108018 A1* | 4/2018 | Lee | G06Q 20/4014 |

FOREIGN PATENT DOCUMENTS

| | | |
|---|---|---|
| EP | 1 416 427 A2 | 5/2004 |
| JP | A-07-271981 | 10/1995 |
| JP | A-11-312225 | 11/1999 |
| JP | 2000-094873 | 4/2000 |
| JP | 2003-242464 A | 8/2003 |
| JP | 2006-119811 | 5/2006 |
| JP | A-2006-163492 | 6/2006 |
| JP | 2006-527424 | 11/2006 |
| JP | 2007-26118 | 2/2007 |
| JP | 2007-233461 | 9/2007 |
| JP | 2007-334707 | 12/2007 |
| JP | 2010-128600 | 6/2010 |
| JP | 3201473 | 12/2015 |
| JP | U-B-3201473 | 12/2015 |

OTHER PUBLICATIONS

Odelu, Vanga et al. A Secure Biometrics-Based Multi-Server Authentication Protocol Using Smart Cards. IEEE Transactions on Information Forensics and Security, vol. 10, Issue: 9. https://ieeexplore.ieee.org/stamp/stamp.jsp?tp=&arnumber=7115930 (Year: 2015).*
Lu, Jian-Zhu et al. An enhanced biometrics-based remote user authentication scheme using smart cards. 2013 6th International Congress on Image and Signal Processing (CISP). https://ieeexplore.ieee.org/stamp/stamp.jsp?tp=&arnumber=6743940 (Year: 2013).*
Search Report dated Jul. 5, 2018 in Singaporean Patent Application No. 10201801644Q.
Search Report dated Jul. 5, 2018 in Singsporean Patent Application No. 10201801644Q.
Extended Search Report dated Jul. 25, 2018 in European Patent Application No. 18158361.8.
U.S. Non-Final Office Action dated Dec. 27, 2019 in co-pending U.S. Appl. No. 15/904,622.
Search Report end Written Oinion dated Sep. 14, 2018 in coresponding Singaporean Patent Appfication No. 10201801705U, 7 pages.
Extended European Search Report dated Jul. 26, 2018 in Patent Application No. 18159706.3.
U.S Final Office Action dated Apr. 29, 2020 in co-pending U.S. Appl. No. 15/904,622.
Offite Action dated Jun. 29, 2020 in co-pending U.S. Appl. No. 15/904,622, 12 pages.
Office Action dated Mar. 5, 2020 to co-pending U.S. Appl. No. 15/904,622, 18 pages.

* cited by examiner

IC CARD AND METHOD FOR CONTROLLING IC CARD

CROSS REFERENCE TO RELATED APPLICATION

This application is based upon and claims the benefit of priority from Japanese Patent Application No. 2017-054474, filed Mar. 21, 2017, the entire contents of which are incorporated herein by reference.

BACKGROUND

Field

Embodiments of the present invention relate to an integrated circuit (IC) card and a method for controlling the IC card.

Description of Related Art

In recent years, security attacks targeting personal information have expanded, and ID cards such as bank automatic teller machine (ATM) cards, credit cards, and personal number cards have been transferred to IC cards equipped with IC chips. In this context, IC cards having a function of performing personal authentication using biometric information such as the fingerprints of users who use IC cards are beginning to become widespread. However, in this conventional technology, a large amount of processing time is required for a collation process using biometric information such as fingerprint data.

DETAILED DESCRIPTION

An integrated circuit (IC) card of an embodiment includes a communicator, a storage storing biometric authentication information, an acquirer, and a processor. The communicator communicates with a terminal device. The acquirer acquires biometric information of a user. The processor collates the biometric information of the user acquired by the acquirer with the biometric authentication information stored in the storage and stores a collation result into the storage at an activation time.

Hereinafter, an IC card and a method for controlling the IC card according to embodiments will be described with reference to the drawings. Although the IC card of the embodiment is assumed to be a contact type IC card in the following description, a non-contact type IC card may be used.

Figure 1:
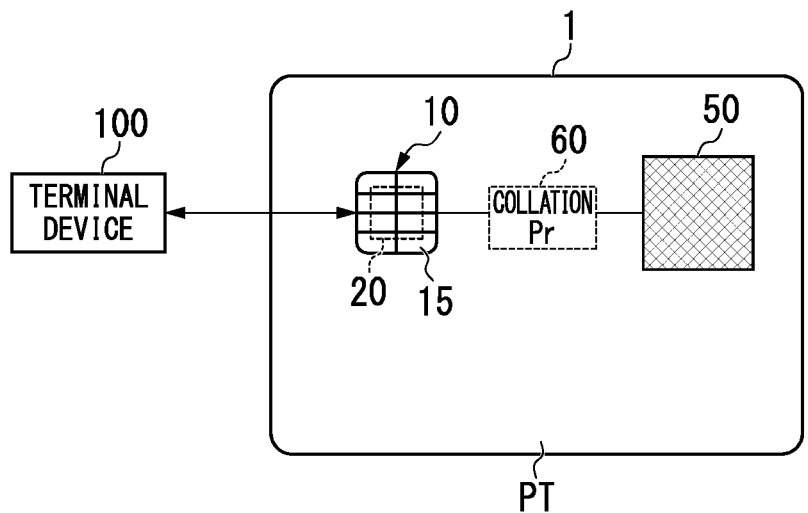
FIG. 1 is a schematic configuration diagram of an IC card according to an embodiment.

FIG. 1 is a schematic configuration diagram of an IC card 1 according to the embodiment. For example, the IC card 1 is formed by mounting an IC module 10 on a plastic card base material PT (an example of a card body). That is, the IC card 1 includes the IC module 10, a fingerprint sensor 50, a collation processor (collation Pr in FIG. 1) 60, and the card base material PT in which these are embedded. The IC card 1 can communicate with an external terminal device 100 via a contact portion 15. The collation processor 60 authenticates a user by comparing fingerprint information of the user acquired by the fingerprint sensor 50 with biometric authentication information held within the IC module 10 and outputs an authentication result to the IC module 10. The fingerprint sensor 50 is an example of an "acquirer" for acquiring biometric information and the fingerprint information is an example of the "biometric information." The biometric information may be vein pattern information, iris information, voice print information, DNA information, or the like as well as fingerprint information. A case in which the collation processor 60 is provided outside the IC module 10 is only an example and the IC module 10 may have a function corresponding to that of the collation processor 60.

For example, the IC card 1 receives a command (a processing request) transmitted by the terminal device 100 via the contact portion 15 and executes processing (command processing) according to the received command. Then, the IC card 1 transmits a response (a processing response) which is a result of executing the command processing to the terminal device 100 via the contact portion 15. The terminal device 100 is a device configured to communicate with the IC card 1, and is, for example, a device including a reader/writer device.

The IC module 10 includes the contact portion 15 and an IC chip 20. For example, the IC module 10 is a module by which a transaction is performed in the form of a chip on tape (COT) in which a plurality of IC modules 10 are arranged on a tape or the like. A single IC module 10 cut out and isolated from the tape may be referred to as a COT.

The contact portion 15 has terminals for various types of signals necessary for the IC card 1 to operate. The terminals for the various types of signals include terminals for supplying a power supply voltage, a clock signal, a reset signal, and the like from the terminal device 100 and a serial data input/output terminal (an SIO terminal) for communicating with the terminal device 100.

The IC chip 20 includes, for example, a large scale integration (LSI) such as a one-chip microprocessor.

Figure 2:
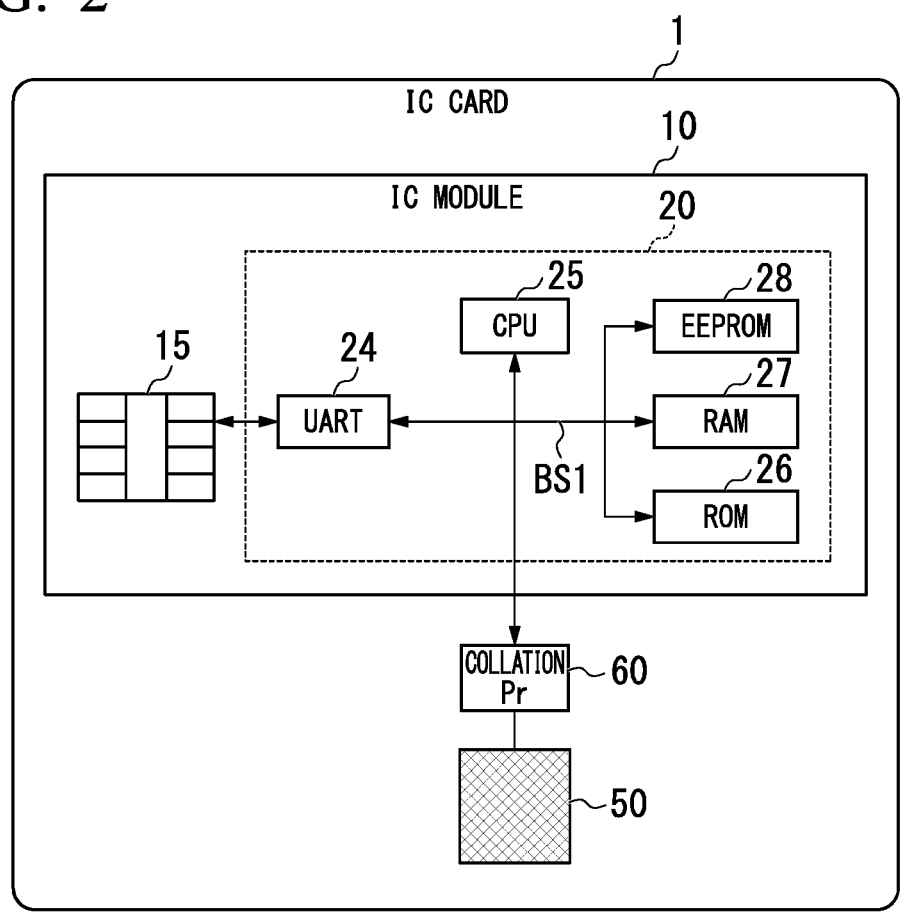
FIG. 2 is a hardware configuration diagram of the IC card according to the embodiment.

FIG. 2 is a hardware configuration diagram of the IC card 1 according to the embodiment. As shown in FIG. 2, the IC card 1 includes the IC module 10 including the contact portion 15 and the IC chip 20. The IC chip 20 includes a universal asynchronous receiver transmitter (UART) 24, a CPU 25, a read only memory (ROM) 26, a random access memory (RAM) 27, and an electrically erasable programmable ROM (EEPROM) 28. These components are connected via an internal bus BS1.

The UART 24 performs serial data communication with the terminal device 100 via the above-described SIO terminal. The UART 24 outputs data (for example, 1-byte data) obtained by performing parallel conversion on the serial data signal received via the SIO terminal to the internal bus BS1. The UART 24 performs serial conversion on data acquired via the internal bus BS1 and outputs serial data to the terminal device 100 via the SIO terminal. For example the UART 24 receives a command from the terminal device 100 via the SIO terminal. The UART 24 transmits a response to the terminal device 100 via the SIO terminal. The UART 24 is an example of a "communicator."

The CPU 25 executes a program stored in the ROM 26 or the EEPROM 28 to perform various types of processes of the IC card 1. For example, the CPU 25 executes command processing according to the command received by the UART 24 via the contact portion 15.

The ROM 26 includes, for example, a nonvolatile memory such as a mask ROM. The ROM 26 stores programs for executing various types of processes of the IC card 1 and data such as a command table.

The RAM 27 includes, for example, a volatile memory such as a static RAM (SRAM). The RAM 27 temporarily stores data to be used when various types of processes of the IC card 1 are performed.

The EEPROM 28 includes, for example, an electrically rewritable nonvolatile memory. The EEPROM 28 stores various types of data used by the IC card 1. For example, the EEPROM 28 stores information used for various types of services (applications) using the IC card 1.

The collation processor 60 is connected to the internal bus BS1. For example, the collation processor 60 includes a CPU and a program memory. The collation processor 60 is connected to the fingerprint sensor 50 by a dedicated line or the like, and can detect whether or not the fingerprint sensor 50 is in a state in which fingerprint information can be acquired (a power-on state). For example, when the user's finger touches the fingerprint sensor 50 and the fingerprint sensor 50 is powered on, the collation processor 60 determines that the fingerprint sensor 50 is in a state in which fingerprint information can be acquired. The fingerprint sensor 50 acquires the fingerprint information of the user in any one of an electrostatic capacitance type, a thermosensitive type, an optical type, and the like.

Figure 3:
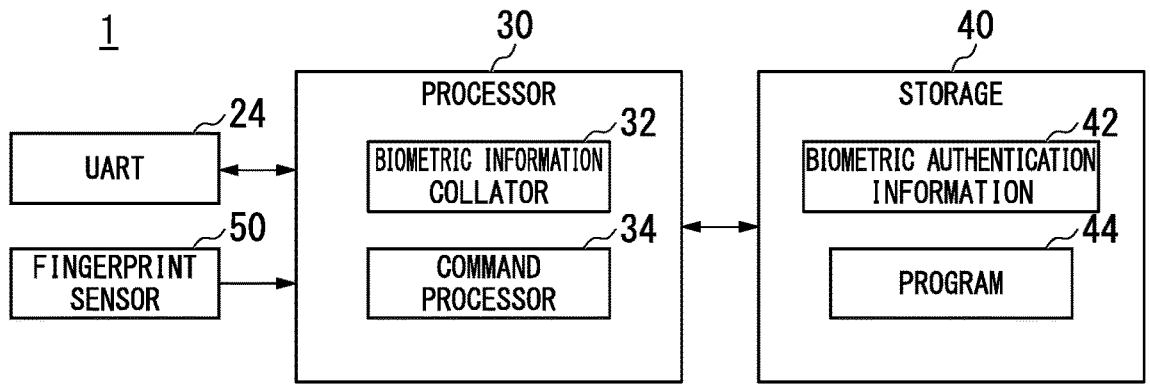
FIG. 3 is a functional configuration diagram of the IC card according to the embodiment.

FIG. 3 is a functional configuration diagram of the IC card 1 according to the embodiment. For example, the IC card 1 includes the above-described UART 24 and fingerprint sensor 50, a processor 30, and a storage 40. For example, the processor 30 includes a biometric information collator 32 and a command processor 34. For example, the command processor 34 is implemented by the CPU 25 executing a program 44.

For example, the biometric information collator 32 is implemented by the collation processor 60 executing the program 44. For example, the storage 40 is implemented by a program memory attached to the EEPROM 28 or the collation processor. In the storage 40, the biometric authentication information 42 and the program 44 are pre-stored. The biometric authentication information 42 is information to be collated with the fingerprint information acquired by the fingerprint sensor 50 and includes information in which a shape pattern of a fingerprint is designated as geometric information, information converted into some feature amount, a combination thereof, or the like. For example, the biometric authentication information 42 includes various types of information extracted from the fingerprint of the user who is an owner of the IC card.

The biometric information collator 32 compares the fingerprint information acquired by the fingerprint sensor 50 with the biometric authentication information 42 pre-stored in the storage 40 and determines that the personal authentication succeeds when these match. For example, "matching" means that a score indicating a degree of matching of information is greater than or equal to a threshold value. When the personal authentication succeeds, the biometric information collator 32 permits access to a secure region in the storage 40 and is brought into a state in which a predetermined process can be executed.

The command processor 34 executes processing (command processing) of various types of commands in accordance with a command (a processing request) transmitted by the terminal device 100. The command processor 34 transmits a response, which is a result of command processing, to the terminal device 100 via the UART 24. With respect to the command processing under a condition of the success of collation (the success of personal authentication), in a case that the authentication success notification is issued from the biometric information collator 32, that is, in a case that access to the secure region in the storage 40 is permitted, the command processor 34 proceeds to perform the process.

Figure 4:
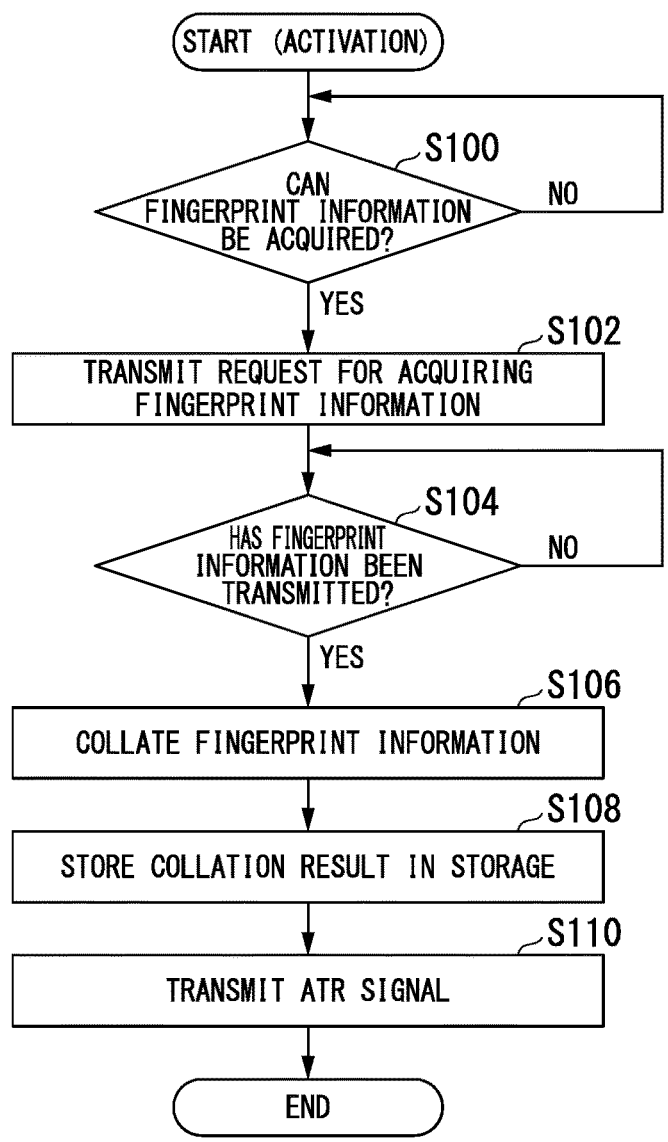
FIG. 4 is a flowchart schematically showing a flow of a process to be executed by an IC chip and a collation processor.

FIG. 4 is a flowchart schematically showing a flow of a process to be executed by the IC chip 20 and the collation processor 60. The process of this flowchart is started when the processor 30 (the IC chip 20 and the collation processor 60) and the fingerprint sensor 50 are activated by supplying electric power to these devices and a RESET signal for an initialization process is received from the terminal device 100.

First, the processor 30 determines whether or not the fingerprint sensor 50 is in a state in which fingerprint information can be acquired (step S100) and transmits request information for requesting transmission of fingerprint information to the fingerprint sensor 50 in a case that it is determined that the fingerprint sensor 50 is in a state in which fingerprint information can be acquired (step S102). In response thereto, the fingerprint sensor 50 transmits the fingerprint information in a predetermined data format and transmission period.

Next, the processor 30 waits for the fingerprint information to be transmitted by the fingerprint sensor 50 (step S104) and collates the fingerprint information acquired by the fingerprint sensor 50 with the biometric authentication information 42 pre-stored in the storage 40 when the fingerprint information is transmitted by the fingerprint sensor 50 (step S106).

Next, the processor 30 stores a collation result (a personal authentication result) into the storage 40 (step S108) and transmits an answer to reset (ATR) signal as a response to the RESET signal to the terminal device 100 (step S110). Thereby, the process of this flowchart ends.

The collation result (the personal authentication result) stored in the storage 40 is assumed to be erased when power supply to the IC card 1 is interrupted and the IC chip 20 or the like is shut down or when power supply to the IC card 1 is restarted and the IC chip 20 or the like is restarted. For example, in a case that the collation result (the personal authentication result) is stored in the RAM 27 of the storage 40, the collation result is erased when power supply is stopped. In a case that the collation result (the personal authentication result) is stored in the EEPROM 28 of the storage 40, the processor 30 erases the collation result stored in the EEPROM 28 at a reactivation time.

[Biometric Authentication During Initialization Process]

Figure 5:
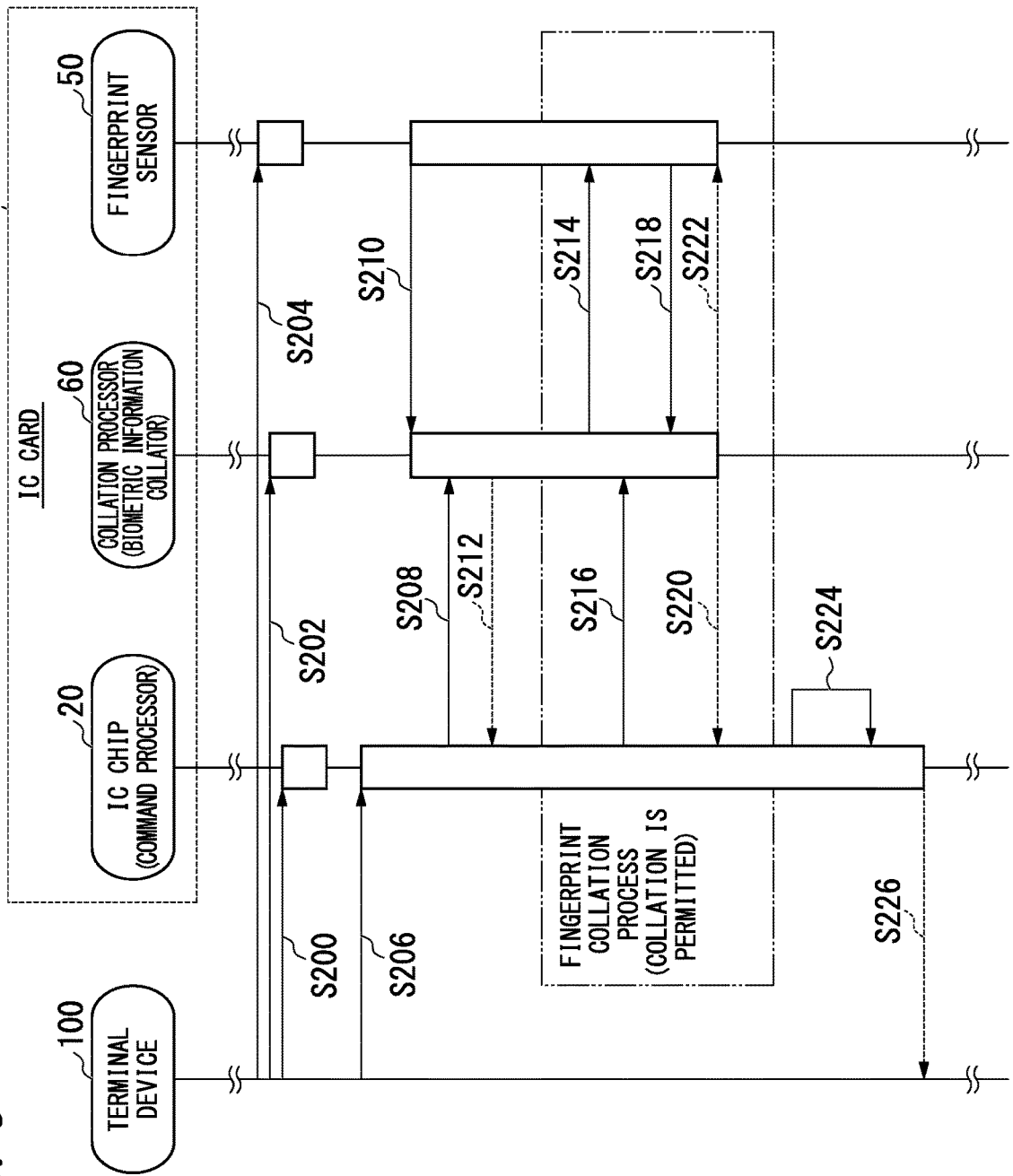
FIG. 5 is a sequence diagram showing an example of a process executed by a terminal device and the IC card.

FIG. 5 is a sequence diagram showing an example of a process to be executed by the terminal device 100 and the IC card 1. The present sequence is performed in a situation in which power is supplied from the terminal device 100 to the IC card 1. In the following description, as an example, the IC chip 20 will be described as the command processor 34 and the collation processor 60 will be described as the biometric information collator 32.

First, the terminal device 100 supplies electric power to each of the IC chip 20, the collation processor 60, and the fingerprint sensor 50 of the IC card 1 (steps S200, S202, and S204).

Next, the terminal device 100 transmits a RESET signal to the IC chip 20 (step S206). When the RESET signal is received from the terminal device 100, the IC chip 20 activated by receiving power supply transmits confirmation information for confirming whether or not the fingerprint collation process is possible to the collation processor 60 (step S208).

On the other hand, the collation processor 60 activated by receiving power supply determines whether or not the fingerprint sensor 50 is in a state in which fingerprint information can be acquired on the basis of a power-on state of the fingerprint sensor 50 (step S210).

In a case that it is determined that the fingerprint sensor 50 is in a state in which fingerprint information can be acquired in the processing of S210, the collation processor 60 transmits information indicating the state to the IC chip 20 (step S212). Then, the collation processor 60 transmits request information for requesting transmission of the fingerprint information to the fingerprint sensor 50 in the state in which the fingerprint information can be acquired (step S214).

When the request information is received, the fingerprint sensor 50 transmits the fingerprint information to the collation processor 60 (step S218).

In a case that it is determined that the fingerprint sensor 50 is in the state in which the fingerprint information can be acquired, the IC chip 20 reads the biometric authentication information 42 stored in the storage 40 and transmits the biometric authentication information 42 to the collation processor 60 (step S216).

The collation processor 60 collates the biometric authentication information 42 transmitted by the IC chip 20 with the fingerprint information transmitted by the fingerprint sensor 50 and transmits a collation result (a personal authentication result) to the IC chip 20 and the fingerprint sensor 50 (steps S220 and S222).

Next, when the collation result is received from the collation processor 60, the IC chip 20 stores the received collation result into the storage 40 (step S224). Then, the IC chip 20 transmits the ATR signal to the terminal device 100 by using the UART 24 (step S226).

[Biometric Authentication During Command Processing Corresponding to Collation Command]

Figure 6:
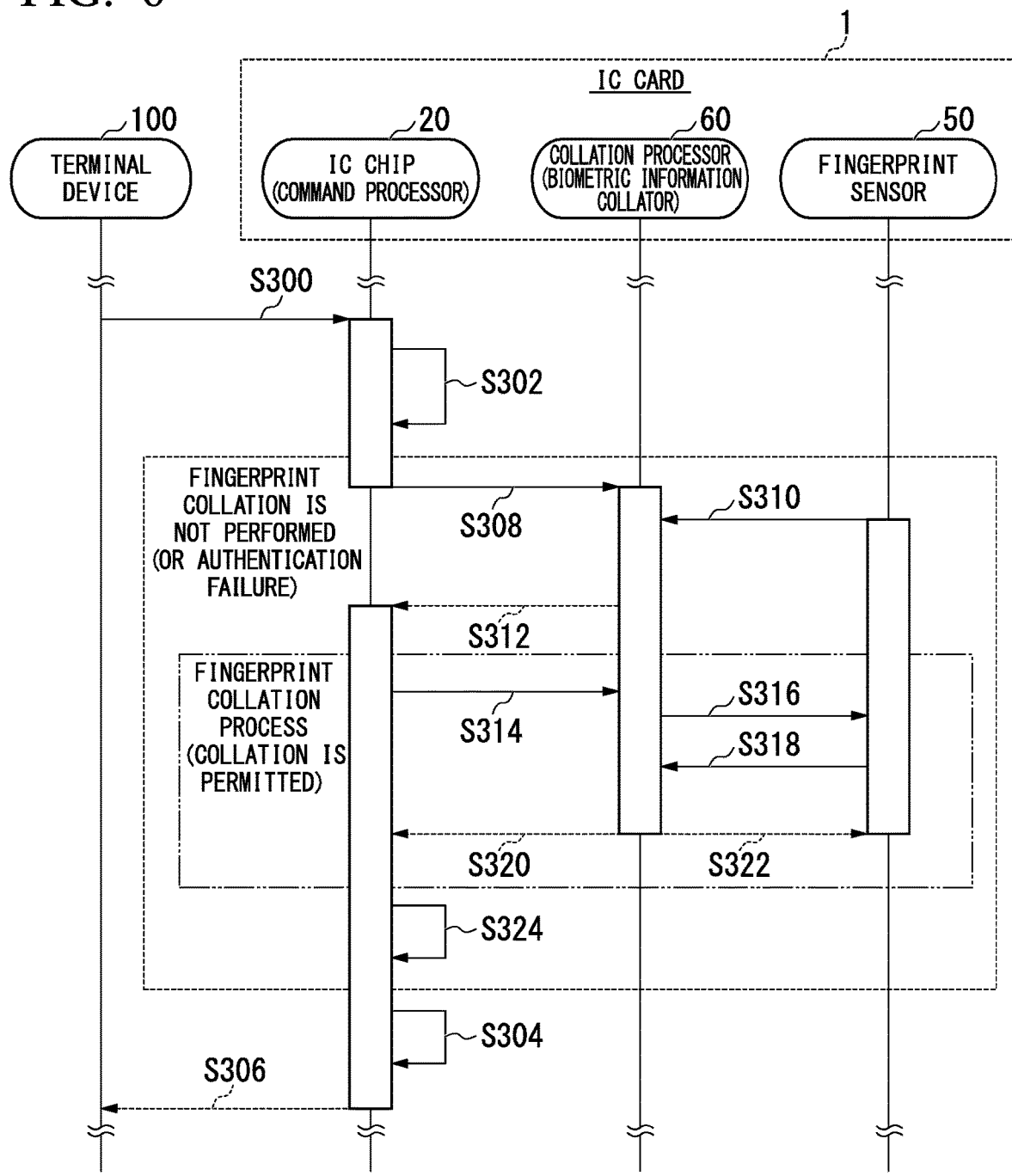
FIG. 6 is a sequence diagram showing another example of a process to be executed by the terminal device and the IC card.

FIG. 6 is a sequence diagram showing another example of a process to be executed by the terminal device 100 and the IC card 1. This sequence is performed in a situation in which a "collation command" is transmitted from the terminal device 100 to the IC card 1 after each device of the IC card 1 is activated. The collation command is, for example, a command transmitted when a user who uses the IC card 1 performs personal authentication in response to a request from the terminal device 100 side.

First, the terminal device 100 transmits the collation command to the IC chip 20 (the command processor 34) of the IC card 1 (step S300).

Next, the IC chip 20 determines whether or not the collation result is stored in the storage 40 (step S302) and executes command processing corresponding to the collation command in accordance with the collation result by omitting the above-described fingerprint collation process when it is determined that the collation result is stored in the storage 40 (step S304). Then, the IC chip 20 transmits a response, which is a command processing result, to the terminal device 100 via the UART 24 (step S306).

For example, in a case that the collation result is "mismatching," that is, in a case that the personal authentication fails, the IC chip 20 transmits error information or the like as a response to the terminal device 100 without proceeding to perform the process. On the other hand, in a case that the collation result is "matching," that is, in a case that the personal authentication succeeds, the IC chip 20 proceeds to perform the command processing.

On the other hand, in a case that it is determined that the collation result is not stored in the storage 40, the IC chip 20 transmits confirmation information for confirming whether or not the fingerprint collation process is possible to the collation processor 60 (the biometric information collator 32) (step S308) and starts the above-described fingerprint collation process. For example, the collation result is not stored in the storage 40 in a case that a finger is not placed on the fingerprint sensor 50 at the time of activation of the IC chip 20 or the like and a processing time is timed out. In this case, the IC chip 20 starts the fingerprint collation process.

Next, the collation processor 60 determines whether or not the fingerprint sensor 50 is in a state in which fingerprint information can be acquired on the basis of the power-on state of the fingerprint sensor 50 (step S310). In a case that it is determined that the fingerprint sensor 50 is in a state in which fingerprint information can be acquired, the collation processor 60 transmits information indicating the state to the IC chip 20 (step S312).

Next, in a case that it is determined that the fingerprint sensor 50 is in a state in which fingerprint information can be acquired, the IC chip 20 reads biometric authentication information 42 stored in the storage 40 and transmits the biometric authentication information 42 to the collation processor 60 (step S314).

On the other hand, the collation processor 60 transmits request information for requesting transmission of the fingerprint information to the fingerprint sensor 50 in the state in which the fingerprint information can be acquired (step S316). When the request information is received, the fingerprint sensor 50 transmits the fingerprint information to the collation processor 60 (step S318).

Next, the collation processor 60 collates the biometric authentication information 42 transmitted by the IC chip 20 with the fingerprint information transmitted by the fingerprint sensor 50 and transmits a collation result (a personal authentication result) to the IC chip 20 and the fingerprint sensor 50 (steps S320 and S322).

Next, when the collation result is received from the collation processor 60, the IC chip 20 stores the collation result into the storage 40 (step S324). Then, the IC chip 20 executes command processing corresponding to a collation command on the basis of the collation result stored in the storage 40 in the processing of S324 as the processing of S304 described above.

Although an example in which the IC chip 20 (the command processor 34) and the collation processor 60 (the biometric information collator 32) perform the fingerprint collation process in a case that it is determined that the collation result is not stored in the storage 40 as the processing result of S302 has been described in the above-described embodiment, the present invention is not limited thereto. For example, the IC chip 20 (the command processor 34) and the collation processor 60 (the biometric information collator 32) may perform the fingerprint collation process in a case that the collation result is stored in the storage 40 and it is determined that the collation result is "mismatching" or "failure of personal authentication" after it is determined whether or not the collation result is "matching" or "success of personal authentication." The collation result of "matching" or "success of personal authentication" is an example of a "predetermined condition." Thus, the personal authentication can be performed twice at an activation time and at a collation command time.

Although an example in which the IC chip 20 (the command processor 34) and the collation processor 60 (the biometric information collator 32) perform the fingerprint collation process at the activation time has been described in the above-described embodiment, the present invention is not limited thereto. For example, the IC chip 20 (the command processor 34) and the collation processor 60 (the biometric information collator 32) may perform the fingerprint collation process when a command processing corresponding to a SELECT (SELECT [by DF name]) command is performed. The SELECT command is a command for designating a predetermined file (a dedicated file) of an application stored in the storage 40 and is a command received from the terminal device 100 before at least the collation command. The SELECT command is an example of a "predetermined command".

According to at least one embodiment described above, there are provided a storage (40) storing biometric authentication information (42); an acquirer (the fingerprint sensor 50) configured to acquire biometric information (fingerprint information) of the user; and a processor (30) configured to collate the biometric information of the user acquired by the acquirer with the biometric authentication information stored in the storage and store a collation result into the storage at an activation time, thereby shortening a processing time required for personal authentication because a process of collating the biometric information is executed at a timing earlier than a timing at which a collation command in which the collation of the biometric information is required is received.

The above-described embodiment can be represented as follows.

An integrated circuit card including:
a communicator configured to communicate with a terminal device;
a storage storing biometric authentication information;
an acquirer configured to acquire biometric information of a user; and
a hardware processor configured to execute a program stored in the storage,
wherein the processor is configured to execute a process of collating the biometric information of the user acquired by the acquirer with the biometric authentication information stored in the storage and store a collation result into the storage at an activation time by executing the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An integrated circuit card comprising:
a receiver-transmitter configured to communicate with a terminal device;
a storage storing biometric authentication information;
a sensor configured to acquire biometric information of a user; and
a processor configured to perform a series of processes, the series of processes configured to compare the biometric information of the user acquired by the sensor with the biometric authentication information stored in the storage, authenticate the user on the basis of the comparison result, and store the authentication result of the user into the storage,
wherein the processor is further configured to transmit an answer to reset signal to the terminal device via the receiver-transmitter when the receiver-transmitter receives a reset signal from the terminal device,
wherein the processor is further configured to perform the series of processes within a period from when the receiver-transmitter receives the reset signal until the processor transmits the answer to reset signal using the receiver-transmitter,
wherein the processor is further configured to determine whether or not the sensor is in a state in which the biometric information can be acquired when the receiver-transmitter receives the reset signal,
wherein the processor is further configured to perform the series of processes when the processor determines that the sensor is in the state in which the biometric information can be acquired,
wherein the processor is further configured to determine whether or not the authentication result has been stored in the storage in a case that the receiver-transmitter receives a select command from the terminal device after the processor and the sensor are activated,
wherein the processor is further configured to perform command processing on the basis of the authentication result in a case that the processor determines that the authentication result has been stored in the storage,
wherein the processor is further configured to transmit a response according to the command processing to the terminal device using the receiver-transmitter, and
when (i) the receiver-transmitter receives a compare command from the terminal device and (ii) the authentication result is not stored in the storage or the biometric information of the user acquired by the sensor and the biometric authentication information stored in the storage are mismatching, then the processor is further configured to compare the biometric information of the user acquired by the sensor with the biometric authentication information stored in the storage as the series of processes.

2. The integrated circuit card according to claim 1, wherein
the processor is further configured not to perform the series of processes as a part of the command processing associated with the select command when the receiver-transmitterreceives the select command from the terminal device and the processor determines that the authentication result is stored in the storage.

3. The integrated circuit card according to claim 1, wherein
the processor is further configured to:
perform the series of processes as a part of the command processing associated with the select command when the processor determines that the authentication result has not been stored in the storage; and perform the command processing based on the authentication result obtained by the series of processes.

4. The integrated circuit card according to claim 1, wherein
the processor is further configured to:
determine whether or not the personal authentication of the user has been successful when the processor determines that the authentication result has been stored in the storage;
perform the series of processes as a part of the command processing associated with the select command when the processor determines that the personal authentication of the user has not been successful; and
perform the command processing based on a result of performing the series of processes as the part of the command processing associated with the select command.

5. The integrated circuit card according to claim 1, wherein
the processor is further configured to perform the series of processes as a part of a command processing associated with a second select command received before the select command at other than a period when the processor determines that the authentication result has not been stored in the storage.

6. A method for controlling an integrated circuit card comprising a processor, a receiver-transmitter configured to communicate with a terminal device, a storage storing biometric authentication information, and a sensor configured to acquire biometric information of a user, the method comprising:
performing a series of processes, the series of processes configured to compare the biometric information of the user acquired by the sensor with the biometric authentication information stored in the storage, authenticate the user on the basis of the comparison result, and store the authentication result of the user into the storage;
transmitting an answer to reset signal to the terminal device via the receiver-transmitter when the receiver-transmitter receives a reset signal from the terminal device;
performing the series of processes within a period from when the receiver-transmitter receives the reset signal until the processor transmits the answer to reset signal;
determining whether or not the sensor is in a state in which the biometric information can be acquired when the receiver-transmitter receives the reset signal;
performing the series of processes when it is determined that the sensor is in the state in which the biometric information can be acquired;
determining whether or not the authentication result has been stored in the storage in a case that the receiver-transmitter receives a select command from the terminal device after the processor and the sensor are activated;
performing command processing on the basis of the authentication result in a case that the processor determines that the authentication result has been stored in the storage;
transmitting a response according to the command processing to the terminal device using the receiver-transmitter; and
when (i) the receiver-transmitter receives a compare command from the terminal device and (ii) the authentication result is not stored in the storage or the biometric information of the user acquired by the sensor and the biometric authentication information stored in the storage are mismatching, then the method further includes comparing the biometric information of the user acquired by the sensor with the biometric authentication information stored in the storage as the series of processes.

7. An integrated circuit card comprising:
a sensor configured to acquire biometric information of a user;
an integrated circuit module comprising a receiver-transmitter configured to communicate with a terminal device, a storage storing biometric authentication information, and a processor configured to perform a series of processes, the series of processes configured to compare the biometric information of the user acquired by the sensor with the biometric authentication information stored in the storage, authenticate the user based on the comparison result, and store the authentication result of the user into the storage; and
a card base material in which the sensor and the intergrated circuit module are embedded,
wherein the processor is further configured to transmit an answer to reset signal to the terminal device via the receiver-transmitter when the receiver-transmitter receives a reset signal from the terminal device,
wherein the processor is further configured to perform the series of processes within a period from when the receiver-transmitter receives the reset signal until the processor transmits the answer to reset signal,
wherein the processor is further configured to determine whether or not the sensor is in a state in which the biometric information can be acquired when the receiver-transmitter receives the reset signal,
wherein the processor is further configured to perform the series of processes when the processor determines that the sensor is in the state in which the biometric information can be acquired,
wherein the processor is further configured to determine whether or not the authentication result has been stored in the storage in a case that the receiver-transmitter receives a select command from the terminal device after the processor and the sensor are activated,
wherein the processor is further configured to perform command processing on the basis of the authentication result in a case that the processor determines that the authentication result has been stored in the storage,
wherein the processor is further configured to transmit a response according to the command processing to the terminal device using the receiver-transmitter, and
when (i) the receiver-transmitter receives a compare command from the terminal device and (ii) the authentication result is not stored in the storage or the biometric information of the user acquired by the sensor and the biometric authentication information stored in the storage are mismatching, then the processor is further configured to compare the biometric information of the user acquired by the sensor with the biometric authentication information stored in the storage as the series of processes.

* * * * *